United States Patent Office 3,301,723

Patented Jan. 31, 1967

3,301,723
GELLED COMPOSITIONS CONTAINING GALACTOMANNAN GUMS

Joseph D. Chrisp, Claymont, Del., assignor to E. I. du Pont de Nemours and Company, Wilmington, Del., a corporation of Delaware No Drawing. Filed Feb. 6, 1964, Ser. No. 343,140
20 Claims. (Cl. 149—20)

This invention relates to a process for gelling aqueous solutions of water-dispersible, non-ionic, natural hydroxylated polymers. More particularly, this invention relates to a process for making water-bearing gels containing galactomannans and to certain products obtained thereby, including explosives.

Hydrophilic vegetable gums have been articles of commerce for hundreds of years. These natural gums constitute a class of organic substances structurally related to the sugars and carbohydrates. They have the characteristics property of forming viscous colloidal solutions (sols) or mucilages in water, either by dissolving, i.e., dispersing uniformly, in the water or by absorbing many times their own volume of water. A wide range of solution or sol properties can thus be obtained by use of diffierent gums under a variety of conditions. The properties of the hydrophilic gums, especially in solutions, make them extremely valuable in manufacturing processes. Wide applications for the gums have been found in the textile, cosmetic, pharmaceutical, and food industries, and to a lesser extent, in other industries.

Addition of the gums, even in very low concentrations, to solutions can cause remarkable increases in viscosity, and relatively speaking, a further slight increase in the gum concentration will often give a gel structure. The viscosity-building, or thickening, action of the gums in aqueous systems may be all that is desired at times, whereas in other circumstances, a substantial immobilization of the water-bearing composition by formation of a gel is desired. Gel formation is particularly desirable when undissolved solids are present in a system and must be maintained in a relatively uniform state of dispersion therein, even after removal from the mixer or other dispersing device.

As used herein, a gel is a mixture, one component of which is water, homogenous down to substantially colloidal dimensions and capable of resisting a finite shearing force. This resistance to shearing is evidence of some sort of continuous mechanical network or structure which, however, can constitute a relatively small fraction of the total mass of the composition of which the gel is a component. Thus, the gel forms a matrix in which both dissolved and undissolved components can be distributed. Simply cooling a gum solution prepared at elevated temperatures, or increasing the concentration of the dissolved or dispersed gum, may lead to gel formation. Such gels, however, often have relatively low practical utility because they are physically weak and tend to rupture and crumble, or because gel formation is reversible with increases in temperature, or because the gel structure collapses in the presence of other components in the mixture, especially in the presence of dissolved electrolytes. Further, the increased concentration of relatively expensive gum which is required to obtain a greater degree of immobility of the aqueous system often imposes a substantial economic penalty on the resulting composition.

Galactomannans constitute one of the industrially important classes of gums, of which locust bean gum and guar gum are the most important members. These gums have a high tolerance for dissolved electrolytes and produce high-viscosity systems in water and in salt solutions, but gelation of solutions or sols of such gums occurs only at relatively high concentrations of galactomannan. As a consequence, crosslinking agents are used to hasten the formation of gels, to form gels at relatively low gum concentrations, and to form gels having properties not obtainable by the use of the gums alone. An effective and well known crosslinking agent for the hydrated galactomannans, especially fo guar gum, is the borate ion which acts as a crosslinking agent with hydrated guar gum to form cohesive structural gels. The process of crosslinking guar-containing compositions by adding borate ions has been employed in the manufacture of ammonium nitrate-based blasting agent compositions, as disclosed and claimed in U.S. Patent No. 3,072,509. Such blasting agents have a body or consistency which makes them resistant to dispersion by water and also facilitates their handling and loading. Additionally, such crosslinked blasting agents are economical and safe to use, and have better storage properties, that is, they retain their favorable physical properties for a considerably longer period of time, than do similar compositions which are made thicker simply by increasing the concentration of gum without addition of a crosslinking agent.

Experience in the use of the borate-crosslinked gels has shown, however, that the gels will degrade under adverse conditions of storage, for example at 100° F., even when protected from loss of water by evaporation. Deterioration in storage is even more apparent in the gels containing high concentrations of electrolytes such as the ammonium nitrate-containing blasting agent compositions referred to hereinbefore.

This invention provides a unique process for forming stable gels of galactomannan gums having, for example, many times the stability of borate-crosslinked galactomannan gum gels. Also, this invention provides a process for readily controlling the rate of gelation of galactomannan gums and the consistency of the gels obtained thereby and, thus, provides gels having a wide spectrum of utility.

The process of this invention for gelation of galactomannan gums comprises mixing water, galactomannan gum, base, and crosslinking agent selected from at least one of the group consisting of the compounds of transition metals of atomic number 21 to 26 inclusive, 39 to 41 inclusive, 57, 72, and 73, said crosslinking agent being soluble in the system and providing from about 0.005 to 5 millimoles of transition metal, i.e., calculated as metal, per gram of galactomannan, said gelation being conducted at a pH of from about 6 to 13. As used herein, "millimole" means "milligram-mole."

In carrying out the process of this invention, it generally is desirable to hydrate the galactomannan appreciably prior to the incorporation of base, since at high pH values, e.g., abouve 10, hydration is materially retarded. By hydration is meant the association of water molecules with galactomannan molecules that occurs when the galactomannan is uniformly dispersed in an aqueous system. Such hydration, which is accompanied by swelling of the galactomannan and an increase in the viscosity of the system, should not be confused with the crosslinking that takes place in the instant process. Incorporation of base and crosslinking agents into aqueous systems containing prehydrated galactomannan gum in accord with this invention produces gelled products that not only have higher viscosities than are obtainable by hydration of equivalent concentrations of galactomannan alone, but also, because of the occurrence of crosslinking therein, have advantageous characteristics not achievable by increases in viscosity alone. These characteristics, which include, for example, a high degree of cohesiveness and prolonged resistance to degradation at elevated temperature, to segregation of components, and to ingress of additional water, will be more fully appreciated as the invention is further described. It may be stated here, however, that when prehydrated galactomannan gum in water is treated with base and the crosslinking agents of this invention, the net increase in viscosity will be at least ten-fold and usually in the order of fifty- to one hundred-fold or more. The presence of large amounts of dissolved and dispersed components, as for example in the explosive compositions to be described hereafter, reduces the concentration of water that can be included in the compositions. In such cases, the net increase in viscosity on addition of base and crosslinking agent to the system containing hydrated gum will generally be in the order of two- to four-fold or more.

The crosslinking agents of this invention can be added to the galactomannan-containing mixture after the pH thereof has been adjusted by the addition of base, but it usually is preferable to add the base after the crosslinking agent has been incorporated into the galactomannan and water in order to minimize interaction of water and base with crosslinking agent. Thus, it generally is preferred to add the crosslinking agent either with the galactomannan or to a preformed galactomannan solution, and then to add base. Alternatively, however, if a base that reacts slowly such as magnesium oxide is used, the galactomannan, crosslinking agent, and base can be added to the water simultaneously. As is described more fully hereinafter, the extent and speed of crosslinking and gelation varies with the particular crosslinking agent selected, the strength and solubility of the base employed, and the concentrations of the crosslinking agent and the base. In general, for a given galactomannan concentration, the speed of crosslinking and, to a lesser degree, the extent thereof, increase with the solubility of the crosslinking agent and the strength and solubility of the base employed. Similarly, all other variables being constant, the apparent rate and degree of crosslinking increase with galactomannan concentration.

The process of the instant invention is effective in crosslinking galactomannans generally, including locust bean gum and guar gum, as well as other galactomannan gums, such as those from endosperms of seeds of other leguminous plants such as the sennas, brazilwood, tara, honey locust, paloverde, and rattlebox, alfalfa gum, clover gum, and fenugreek gum. In present commerce, however, the most important galactomannan gums are locust bean gum and guar gum. Locust bean gum is milled endosperm of the seeds of the leguminous plant, *Ceratonia siliqua*. It is marketed under a variety of other names, including Carob gum, gum Gatto, gum Hevo, Jandagum, Lakoegum, Rubigum, Lupogum, Luposol, gum Tragon, Trafarab, and Tragasol. Guar gum, on the other hand, generally is identified as such. It is milled endosperm from the seeds of the plant *Cyamopsis tetragonolobus*, also of the family Leguminosa. Preferably, the aqueous gelation systems contain about from 0.25 to 5% by weight of one or more of the aforementioned gums, although solutions containing 10% or more of gum can be used.

As was indicated previously, the crosslinking agents used in this invention are compounds, soluble in the system, of the transition metals of atomic number 21 to 26 inclusive, 39 to 41 inclusive, 57, 72, and 73, namely of the metals scandium, titanium, vanadium, chromium, manganese, iron, yttrium, zirconium, niobium (columbium), lanthanum, hafnium, and tantalum. By the terminology "compounds of the transition metals soluble in the system" is meant chemical compounds of these metals that can be dissolved in the subject aqueous gelation systems to the extent of at least one part per million. Of course, the crosslinking agent should be so selected that it reacts preferentially with the galactomannan and not with water or other constituents in the system. The crosslinking agents are generally salts, by which terminology is included not only simple salts but also chelates.

Examples of salts are simple, double, and complex transition metal salts soluble in the system having the formulas MX, MOX, NMX, and NMOX, wherein M is one of the aforementioned transition metals in a positive polyvalent oxidation state, O is oxygen, N is usually ammonium or alkali metal in an oxidation state of +1, and X is the residue or anion of the acid from which the salt is derived. Chelates include those, soluble in the system, having the formulas $$\overset{\frown}{M-Z-Z} \quad \text{and} \quad A-\overset{\frown}{M-Z-Z}$$

wherein M has the aforementioned meaning, Z—Z is a group containing two or more electron donar atoms, usually nitrogen or oxygen, coordinately bonded to M to form a 5- or 6-membered rings, and A is one or more nonchelating groups satisfying the coordination number of M. The above formulas are intended to indicate generally the composition of the salt and chelate crosslinking agent molecules, and not the precise relationship or number of the constituent members thereof, which will vary with the particular compound. Oxides and hydrated oxides (including hydroxides) of the transition metals are generally unsuitable crosslinking agents because, in general, they are insoluble in the aqueous gelation systems. A few compounds, such as the transition metal alkoxides, M—(O—alkyl)$_n$, react preferentially with the water in the subject gelation systems to form insoluble oxides and hydroxides which, as just indicated, do not in general meet the aforementioned solubility requirements.

Although some atoms or groups are unique and much preferred, in the broadest aspects of this invention the nature of the particular nontransition metal atoms or groups in the crosslinking agent molecules is not critical, but is of significance primarily in terms of the influence such atoms or groups have on the solubility of the compounds in the gelation systems. These atoms or groups can also influence the pH of the systems. "X" or anionic groups that are preferred and can impart suitable solubility when transition metal-containing salts are used are generally derived from inorganic and organic acids having a first dissociation constant with a $pK_a$ value in the range from 0 to about 6. Such acids include, for example, all the hydrogen halide acids; the oxygen acids of nitrogen, sulfur, and phosphorus, particularly nitric and sulfuric acids; and monocarboxylic acids, particularly the lower saturated aliphatic acids containing, e.g., 1 to about 8 carbon atoms, and optionally solubilizing substituents such as halogen, especially formic acid, acetic acid, and the trihalogen-substituted acetic acids. Other "X" and "Z—Z" groups can be derived from polycarboxylic acids and $\alpha$- and $\beta$-hydroxylated mono- and polycarboxylic acids containing, e.g., up to about 8 carbons in the molecule, such as oxalic, lactic, citric, and tartaric acids, or soluble salts of these acids; from amino alcohols, e.g., di- and triethanolamine, and from $\beta$-diketo compounds such as acetylacetone and acetoacetic esters. "A," when present, also should be a group or groups that do not interfere with the foregoing solubility requirements. For example, low-molecular-weight alkoxy or hydroxy radicals are suitable "A" groups.

The transition metal compounds used as crosslinking agents can be introduced into the aqueous gelation systems predissolved in water to facilitate dispersion and mixing. In cases where the compounds inherently have relatively low solubility in water, e.g., scandium, niobium, and tantalum halides, solubility advantageously is increased by introducing these compounds in an aqueous solution to which a small amount of mineral acid, e.g., $HNO_3$, $H_2SO_4$, HF or HCl has been added With other compounds, notably the salts of mineral acids with titanium (III) and (IV), zirconium (IV), or iron (III), the cations tend to undergo insolubilizing hydrolysis reactions very rapidly when allowed to stand in an aqueous medium in which the pH is in the order of 2 or higher. Here it generally is desirable to store and introduce the compounds into the gelation system in the form of a solution in the parent acid (pH below 2). Addition of acid also aids the reactivity of some highly associated transition metal complexes; e.g., ferrocyanides can be used in nitric acid solution. As was intimated hereinbefore, the transition metal compounds themselves, as well as the conditions under which they are introduced into the gelation systems of the instant invention, should generally be such that there will be no appreciable amount of transition metal present in the form of insoluble oxides and hydroxides. If the crosslinking transition metal compounds are introduced in the form of an acid solution, it will of course be necessary to adjust the amount of base added to the aqueous gelation systems accordingly, to bring the pH thereof to 6 or higher.

Examples of specific transition metal compounds that can be used as crosslinking agents in the process of this invention include, but are not limited to, the following group. In this group of compounds, the symbol "OAc" is used to represent the acetate ion, and in some cases, the acetylacetonate ligand is represented by "AcAc." When transition metal salts are generally available in a hydrated form, they are so shown, although other hydrated and dehydrated forms also can be used. Chelate compounds are shown as the monomeric molecules, although some of them normally exist in polymeric forms.

Scandium compounds $ScCl_3$
$Sc(NO_3)_3$
$Sc_2(SO_4)_3 \cdot 5H_2O$

Titanium compounds $TiBr_3 \cdot 6H_2O$
$TiCl_3$
$Ti(SO_4)_2 \cdot 9H_2O$
$Ti_2(SO_4)_3$
$K_2TiO(C_2O_4)_2$ Titanium-lactic acid chelates:

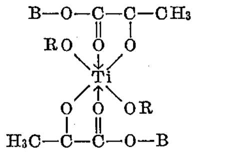

Titanium-acetylacetonate chelates;

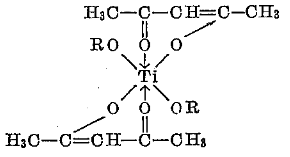

Titanium-triethanolamine chelates:

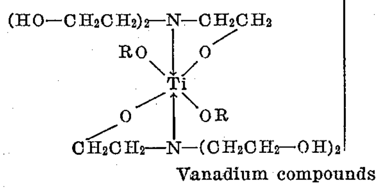

wherein R is H or lower, e.g., 1-8 carbon, alkyl; and B is H or $NH_4$ ion.

Vanadium compounds $VOSO_4$
$VO(OAc)_2$

Chromium compounds $CrBr_3 \cdot 6H_2O$
$CrCl_3 \cdot 10H_2O$
$CrF_3 \cdot 4H_2O$
$Cr(NO_3)_3 \cdot 9H_2O$
$Cr_2(SO_4)_3 \cdot 15H_2O$
$Cr(OAc)_3 \cdot H_2O$ Manganese compounds $MnCl_2$ (or $MnO_2$+HCl)
$MnI_2 \cdot 4H_2O$
$Mn(NO_3)_2 \cdot 6H_2O$
$MnSO_4 \cdot 4H_2O$ Iron compounds $Fe(OAc)_2 \cdot 4H_2O$
$FeSO_4 \cdot 7H_2O$
$FeCl_3 \cdot 6H_2O$
$Fe(NO_3)_3 \cdot 6H_2O$
$Fe_2(C_2O_4)_3 \cdot 5H_2O$
$Fe(AcAc)_3$ Yttrium compounds $Y(OAc)_3 \cdot 4H_2O$
$YBr_3 \cdot 9H_2O$
$YCl_3 \cdot H_2O$
$YI_3$
$Y(NO_3)_3 \cdot 6H_2O$
$Y_2(SO_4)_3 \cdot 8H_2O$ Zirconium compounds $ZrOCl_2 \cdot 8H_2O$
$Zr(SO_4)_2 \cdot 4H_2O$
$Zr(OAc)_4$
$ZrO(NO_3 \cdot 2H_2O$
$ZrOI_2 \cdot 8H_2O$
$Zr(AcAc)_4 \cdot 10H_2O$ Niobium compounds $NbOCl_3$
$KNbCl_6$
$KNbF_6$
$NbCl_5$ Lanthanum compounds $LaCl_3 \cdot 7H_2O$
$La(NO_3)_3 \cdot 6H_2O$
$La(OAc)_3 \cdot 1.5H_2O$ Hafnium compounds $Hfo(NO_3)_2$
$HfoCl_2 \cdot 8H_2O$
$Hf(AcAc)_4 \cdot 10H_2O$ Tantalum compounds $TaOCl_3$
$KTaCl_6$
$TaCl_5$
$TaF_5$ As previously noted, the concentration of transition metal compound or compounds used as crosslinking agent generally should be such as to provide from about 0.005 to 5 millimoles of transition metal, i.e., calculated as the metal, for each gram of galactomannan present. A generally preferred range of concentration will be from about 0.01 to 3 millimoles of transition metal per gram of galactomannan. Within these ranges, the concentration of transition metal most effective for crosslinking will vary slightly with the particular metal. Thus, other variables being substantially constant, compounds of scandium and titanium tend to give optimum crosslinking action over a relatively narrow region of concentration falling near the lower end of the broad range previously specified. Compounds of lanthanum and yttrium, on the other hand, apparently have a relatively wider range of concentration in which there is no appreciable change in their effectiveness for crosslinking, whereas compounds of the remaining eight transition metals tend to fall somewhat between these two extremities in their ranges of most effective concentration.

The use of base in combination with at least one transition metal compound is critical for effective practice of this invention. Without base, compounds of only a few of the transition metals of the aforementioned group, namely, vanadyl, titanium (III) and (IV), and zirconyl compounds, will cause any crosslinking to occur in the aqueous galactomannan solutions. However, compounds of these metals alone do not produce extensive gelation unless they are used in high concentrations, i.e., usually at least an order of magnitude greater than the concentrations that are effective for crosslinking when base is present. In addition to being less economically attractive, such high concentrations of crosslinking agent can cause degradation of the gel structure or other undesirable side reactions. Furthermore, unless base is present, wide variations in the extent and rate of crosslinking may occur, so that reproducible control of the process becomes very difficult.

Like the crosslinking agent, the base conveniently can be added in the form of an aqueous solution or dispersion to facilitate mixing into the gelation system. The term "base" as used herein refers to materials which, when dissolved in water, produce hydroxide ions in concentrations substantially greater than the concentrations normally present in water. Examples of bases that can be used in this invention are the strong bases such as sodium hydroxide, potassium hydroxide, and the other alkali metal hydroxides; the relative weaker ammonium-amine bases such as ammonium hydroxide and dimethyl- and diethylamines; the simple alkaline salts such as $Na_2CO_3$ and $Na_3PO_4$; the alkaline-earth metal hydroxides, such as magnesium, calcium, and barium hydroxides; and the corresponding oxides, MgO, CaO, and BaO. As to the amount of base added, the essential requirement is that enough hydroxide ions be supplied to the reaction mixture, either initially or during the process, to initiate gelation and to produce a gel of the desired consistency. Enough hydroxide ions should be supplied to the gelation system to provide a pH therein of at least about 6, but not higher than 13, during the major portion of the gelation process. As used herein, pH is a measure of the hydroxide ion concentration in the gelation reaction mixtures of the instant invention. Crosslinking is more rapid and more complete at the higher pH values in the specified range, but high concentrations of hydroxide ion may, in some cases, cause syneresis, i.e., visible segregation of liquid, to occur. Maintaining the pH within the range of 7 to 11 during the major part of the reaction is therefore generally preferred. It should be noted, however, that hydroxide ions are consumed in the reaction. Thus, toward the end of the process, it is possible in some instances that the pH will fall slightly below 6.

The time needed for the crosslinking reaction with the transition metal compounds can be varied within wide limits by appropriate choice of the type and amount of base employed. For example, when other variables, including base concentration, are held substantially constant, the time needed for a given degree of crosslinking may be of the order of a few minutes with strong and soluble bases such as sodium hydroxide, whereas it may be up to several hours with weak bases that have low solubility and release hydroxide ions slowly, e.g., magnesium oxide. Thus, magnesium oxide is particularly advantageous in situations where it is desired to obtain a relatively low rate of crosslinking in the compositions of the invention. This base releases hydroxide ions sufficiently slowly that the reaction mixtures can be handled in simple mixers and pumps for periods of the order of several hours before extensive gelation and consequent loss of fluidity occur. It generally is preferable to use from about 0.05 to 5 weight percent of magnesium oxide, based on the total composition, particularly from 0.1 to 2 weight percent.

As indicated above, the rate of gelation and final viscosity of a gelled composition is related to the kind and concentration of the galactomannan the kind and concentration of the crosslinking agent, and the source and concentration of hydroxide ions. Thus, it will be apparent that these variables are interrelated and are readily adjustable to provide a gel having the desired properties during both manufacture and subsequent storage.

The process of this invention can be carried out with the aforementioned galactomannans, water, transition metal compound crosslinking agents, and base as the sole constituents of the reaction mixture. In such cases, the process of this invention and the products obtained thereby find utility, for example, in sizing of papers and textiles and in drilling muds. However, in these as well as in other applications, the reaction mixture can also contain other dispersed or dissolved ingredients. Thus, the process of this invention finds particular utility in making gelled aqueous blasting agents.

In general, aqueous blasting agents prepared in accordance with this invention can be described as stable, gelled, water-bearing explosive compositions comprising at least one water-soluble, inorganic oxidizing salt; at least one fuel; from about 5 to 45%, and preferably from 10 to 30% of water based on the total weight of composition; and, based on the total weight of composition, from about 0.25 to 5% of galactomannan gum gelled at a pH of about from 6 to 13 with base and at least one compound of the transition metals of atomic number 21 to 26 inclusive, 39 to 41 inclusive, 57, 72, and 73 soluble in the system, said compounds being present in an amount to provide from about 0.005 to 5 millimoles of transition metal per gram of galactomannan. In general, except for the gel matrix, such water-bearing explosives are of conventional types and contain at least about 20% by weight of inorganic oxidizing salt or salts, including, e.g., one or more of ammonium, alkali metal, or alkaline-earth metal nitrates and perchlorates, such as ammonium nitrate, ammonium perchlorate, sodium nitrate, sodium perchlorate, potassium nitrate, potassium perchlorate, and calcium nitrate. Preferably, the inorganic oxidizing salt component includes 45% by weight or more of at least one salt which is highly soluble in water at room temperature, i.e., at least as soluble as ammonium nitrate, and the aqueous phase of the composition preferably contains a substantial proportion of the oxidizing salt component, e.g., 40 to 70% by weight thereof.

The fuel component of the aqueous, gelled blasting agents of the present invention can be chosen from one or more of the groups of self-explosive fuels; nonexplosive, carbonaceous fuels; and metallic fuels. Examples of "self-explosive" fuels, that is, substances which per se are generally recognized as explosives and which have a negative oxygen balance with respect to conversion to carbon dioxide, water, and nitrogen, include organic nitro compounds, nitrates, and nitramines, such as TNT, pentaerythritol tetranitrate (PETN), tetranitromethylaniline (tetryl), cyclotrimethylenetrinitramine (RDX) nitrostarch, explosive-grade nitrocellulose, and mixtures of such explosives, e.g., pentolite (PETN/TNT), Composition B or cyclotol (RDX/TNT), and tetrytol (tetryl/TNT). TNT alone or in combination with other explosives is a preferred self-explosive fuel for economic reasons, and can be introduced into the compositions in the form of crystals, grains, pellets, flakes, or any other particulate form which allows ready dispersion thereof. In general, up to about 40% and, preferably, 10 to 35% by weight of self-explosive fuel is used in the blasting agent compositions.

Examples of nonexplosive, carbonaceous fuels include finely divided coal and other forms of finely divided carbon; solid carbonaceous vegetable products, such as starch, ivory nut meal, wood and paper pulps, sugar, bagasse, and the like; solid and liquid organic hydrocarbons such as powdered paraffin waxes and fuel oils; fatty oils; vegetable oils; and mixtures of the foregoing. The galactomannan gums also serve a dual function in being nonexplosive fuels as well as crosslinkable components. Generally, up to 25% and, preferably, from 2 to 20% by weight of such carbonaceous nonexplosive fuels are employed.

Suitable metallic fuels include aluminum, iron, and alloys of such metals, e.g., aluminum-magnesium alloys, ferrosilicon, and ferrosphosphorus, as well as mixtures of such metals and alloys. The quantity of metallic fuel varies markedly with the particular fuel employed and can constitute up to 50% by weight of the total composition. With finely divided aluminum, for example, 1 to 25% by weight is usually used, whereas with heavier metalic fuels, such as ferrophosphorus and ferrosilicon, in the order of 10 to 30% is usually employed. The metallic fuels can be in any particulate form suitable for incorporation in the compositions, for example, powders of varying degrees of fineness, granules, flakes and the like.

Preferred blasting agents of this invention are stable, gelled explosives having an oxygen balance of from about −30 to +10% and, in the case of those blasting agents not containing the heavier metallic fuels such as ferrophosphorus and ferrosilicon, usually from about −10 to +10%. Particularly preferred blasting agent compositions have an oxygen balance in the broad range just mentioned and comprise, in addition to the aforedescribed gel matrix:

(a) From about 20 to 70% of ammonium nitrate;
(b) Up to 40%, preferably 10 to 25% of sodium nitrate;
(c) Up to 40%, preferably 10 to 30% of self-explosive comprising TNT;
(d) Up to 30% of metallic fuel comprising aluminum and/or ferrophosphorus, preferably from 2 to 20% of aluminum and from 5 to 25% of ferrophosphorus;
(e) Up to 10%, preferably 2 to 8% of particulate carbon, such as powdered coal; and
(f) From 5 to 45%, preferably 10 to 30% of water, all the percentages being by weight of the total composition, and said compositions including, as fuel component, (c) alone or a combination of at least two of components (c), (d), and (e).

In general, the explosive compositions of this invention can be prepared by the conventional formulating techniques used for preparing galactomannan or borate-crosslinked galactomannan aqueous explosives, excepting, of course, that the aforementioned transition metal compound crosslinking agents are employed and the gelation is carried out in situ after the addition of base, preferably at the end of the formulating steps. The same general considerations for the control of the process of this invention as were discussed hereinbefore also apply to the blasting agents of this invention, although in the case of explosives, slight variations may be used to achieve gelled compositions having the desired physical and storage properties. Thus, for example, in explosive compositions, the concentration of the aforementioned transition metal compound or compounds used as crosslinking agent will preferably provide from 0.01 to 3 millimoles of transition metal per gram of galactomannan, and more particularly from 0.1 to 1 millimole of transition metal. In the case of ammonium nitrate blasting agents, the pH is held below 9 and preferably below 8 in order to minimize the evolution of ammonia therefrom. Also, such explosives will preferably-contain from about 0.2 to 2% by weight of galactomannan, particularly guar gum.

In the preparation of blasting agents, it is particularly convenient to use concentrated aqueous solutions of ammonium nitrate commonly known as ammonium nitrate liquors. In such cases, the water for the gel matrix is conveniently provided by the aqueous solution of ammonium nitrate, and the other ingredients of the particular blasting agent are added thereto, including galactomannan, crosslinking agent, and preferably as a last step, base, care being taken that all ingredients are uniformly dispersed and that the galactomannan is well hydrated prior to the addition of the base.

Considered as freshly made products, the blasting agents of the instant invention do not differ appreciably in explosive properties from the known explosive compositions crosslinked with borax or other source of borate ion. However, greater variations in the rate of crosslinking and in the physical properties of the finished products are possible with the new compositions than with borate-crosslinked ones. The rate of crosslinking with a combination of added base and transition metal compounds as hereinbefore defined can be much more closely controlled than is possible with borax, with which crosslinking is extremely rapid. The compositions of the instant invention can range from soft, semifluid slurry products that are not adhesive (i.e., not tacky or sticky) to firm, rigid, cohesive gels, whereas rigid gels are the only products usually obtainable with borate crosslinking. Additionally, as is illustrated in detail hereinafter, the compositions obtained by the process of this invention are markedly superior to the borate-crosslinked compositions known heretofore in resistance to degradation in storage, and consequently, in resistance to undesirable changes in both physical and explosive properties with time.

Preferred crosslinking agents, particularly in the case of explosive compositions, are compounds of titanium, chromium, iron, and zirconium, especially chromium nitrate, iron nitrate, chelate titanium compounds, particularly the lactic acid chelates, and zirconium acetate. In addition to being available at reasonable cost, these compounds are particularly effective in providing crosslinked products having high surface tension (i.e., stickiness and tackiness are absent), ready workability, and other desirable physical characteristics in the as-made state. Further, as is shown in detail hereinafter, blasting agent compositions including these preferred crosslinking agents retain their initial physical properties, as well as their explosive properties, during long periods of storage after production. The preferred crosslinking agents also allow latitude in the consistency of the explosive product made, to fit the needs of a particular type of blasting. Thus, other variables being substantially constant, use of iron compounds as crosslinking agent permits preparation of soft, fluid but non-adhesive products, whereas compounds of titanium, chromium, and zirconium tend to give relatively firm and more rigid products.

In the following examples illustrating this invention, the overall composition shown in each case is on a weight percentage basis, except that the amount of crosslinking agent used is expressed in millimoles of transition metal per gram of galactomannan gum in the composition. This is done not only because the quantities of reactive components are related thereby, but also because the concentration of crosslinking transition metal required is so small that it does not affect the percentage compositions within the limits of significance of the figures shown.

*Example 1*

An aqueous crosslinked, gelled composition in record with this invention is made from the following ingredients:

| Composition: | Percent by weight |
|---|---|
| Water | 98.6 |
| Commercial powdered guar gum [1] | 1.0 |
| Sodium hydroxide | 0.4 |
| "Tyzor" LA | (2) |

[1] Known in the industry by such trade names as "Amatex" KD (General Mills) and "Jaguar" 100 (Stein-Hall).

[2] Titanium-ammonium lactate chelate:

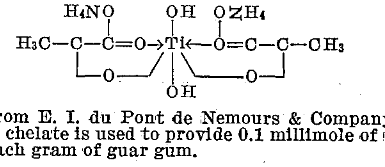

available from E. I. du Pont de Nemours & Company. Sufficient of the chelate is used to provide 0.1 millimole of titanium metal for each gram of guar gum.

The water, at room temperature, is vigorously agitated while the guar gum is added thereto. The agitation is continued until the gum is uniformly dispersed and hydrated and no lumps or aggregates are present. To the resulting solution then is added the indicated concentration of titanium crosslinking agent as a 2-molar solution of "Tyzor" LA chelate in water, and this ingredient also is uniformly mixed into the solution. The titanium chelate is followed by the specified proportion of sodium hydroxide as a 20% aqueous solution, which brings the pH of the reaction mixture above 7. Crosslinking begins after the addition of the base and continues for a period of time thereafter.

For comparison purposes, a solution of guar gum in water containing uniformly dispersed "Tyzor" LA in the concentration indicated above, but no sodium hydroxide, is allowed to stand for 24 hours at about 25° C. At the end of this period, it has a viscosity of less than 20,000 centipoises as measured with a Brookfield viscometer, No. 4 spindle, 0.3 r.p.m. After the addition of 0.4% by weight of sodium hydroxide in the manner described above, thorough mixing, and storage for less than one hour at 25° C., the resulting product is a crosslinked gel that has a viscosity greater than 2,000,000 centipoises, i.e., too great to be measured with the same spindle and speed of the Brookfield viscometer.

Similar results are obtained when commercial powdered locust bean gum is used in place of the guar gum. The concentration of the galactomannan gum chosen will be from about 0.25 to 5% by weight of the total composition.

*Example 2*

The following Table I exemplifies the in situ crosslinking of galactomannan gum in aqueous systems with a variety of added bases and compounds of transition metals of the aforedescribed group. The procedure used to prepare the compositions of Table I is that of Example 1, with the minor exceptions indicated in the table footnotes.

TABLE I

| Formula No. | Composition, Percent by Weight | | | Transition Metal Compound Crosslinking Agent (millimoles of transition metal/gram of guar gum) |
|---|---|---|---|---|
| | Guar Gum | $H_2O$ | Base | |
| 2-A | 1.0 | 98.75 | 0.25, NaOH | 0.1, $ScCl_3$ [1] |
| 2-B | 5.0 | 94.75 | 0.25, NaOH | 0.05, $ScCl_3$ [1] |
| 2-C | 1.0 | 98.87 | 0.13, NaOH | 0.05, $Ti_2(SO_4)_3$ [2] |
| 2-D | 1.0 | 98.87 | 0.13, NaOH | 0.1, $K_2TiO(C_2O_4)_2$ [3] |
| 2-E | 2.0 | 97.9 | 0.1, NaOH | 0.008, $VOSO_4$ |
| 2F | 1.0 | 98.8 | 0.2, MgO | 0.08, $Cr(NO_3)_2 \cdot 9H_2O$ |
| 2-G | 1.0 | 98.7 | 0.3, $Na_3PO_4$ | 0.08, $Cr(NO_3)_2 \cdot 9H_2O$ |
| 2-H | 1.0 | 98.7 | 0.3, $Na_2CO_3$ | 0.08, $Cr(NO_3)_2 \cdot 9H_2O$ |
| 2-I | 1.0 | 98.7 | 0.3, $(CH_3)_2NH$ | 0.08, $Cr(NO_3)_2 \cdot 9H_2O$ |
| 2-J | 1.0 | 98.8 | 0.2, $NH_4OH$ | 0.08, $Cr(NO_3)_2 \cdot 9H_2O$ |
| 2-K | 1.0 | 98.75 | 0.25, NaOH | 0.05, $Mn(OAc)_2 \cdot 4H_2O$ |
| 2-L | 2.0 | 97.9 | 0.1, NaOH | 0.06, $Fe(NO_3)_3$ [1] |
| 2-M | 1.0 | 98.25 | 0.75, NaOH | 0.03, $Y(NO_3)_3$ |
| 2-N | 1.0 | 98.5 | 0.50, NaOH | 0.1, $Y(NO_3)_3$ |
| 2-O | 2.0 | 97.9 | 0.1, NaOH | 0.07, $Zr(OAc)_4$ |
| 2-P | 1.0 | 98.75 | 0.25, NaOH | 0.12, $NbCl_5$ [1] |
| 2-Q | 1.0 | 98.50 | 0.5, NaOH | 0.1, $La(NO_3)_3$ |
| 2-R | 1.0 | 98.50 | 0.5, NaOH | 0.08, $HfO(NO_3)_2$ |
| 2-S | 1.0 | 98.9 | 0.1, NaOH | 0.12, $TaCl_5$ [2] |
| 2-T | 1.0 | 98.9 | 0.1, NaOH | 0.03, $Fe(AcAc)_3$ |
| 2-U | 1.0 | 98.9 | 0.1, NaOH | 0.03, "Tyzor" LA [4] |
| 2-V | 1.0 | 98.9 | 0.1, NaOH | 0.03, "Tyzor" TE [5] |

[1] Dissolved in the parent acid.
[2] Dissolved in water containing a few drops of HF.
[3] Dissolved in water containing a few drops of HCl.
[4] Titanium-ammonium lactate chelate (E.I. du Pont de Nemours & Company):

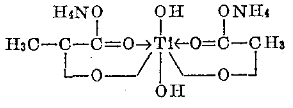

[5] Titanium-triethanolamine chelate (E.I. du Pont de Nemours & Company):

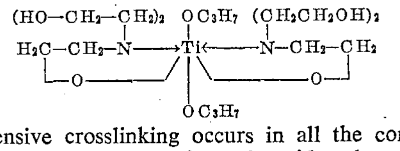

Extensive crosslinking occurs in all the compositions described in Table I, as is made evident by appreciable increases in viscosity, i.e., in the order of at least ten-fold and usually at least fifty- to one hundred-fold, following addition of the crosslinking agent and base to the hydrated galactomannan in water.

The compositions described above can be used as such in textile or paper sizing. Thus, for example, in a continuous process, the stock to be sized is first run through a bath of the guar gum, crosslinking agent, and water; next through an aqueous alkaline bath; and finally allowed to crosslink prior to being dried.

Application of the instant inventive process to the manufacture of blasting agent compositions is illustrated in the following Examples 3 to 5.

*Example 3*

A blasting agent composition is prepared from the following components:

| Composition: | Percent by weight |
|---|---|
| 60 wt. percent ammonium nitrate solution | 49. |
| Granular sodium nitrate | 25. |
| Finely ground guar gum flour | 0.75 |
| Pelleted TNT | 25. |
| Magnesium oxide | 0.25 |
| Zirconium acetate, $Zr(C_2H_3O_2)_4$ | (1) |

[1] Sufficient to provide 0.7 millimole of zirconium for each gram of guar gum present.

The ammonium nitrate liquor in a suitable mixer is heated to a temperature in the 120–180° F. range. Without further heating, a preformed mixture of the sodium nitrate and the guar gum is added and mixed in for about 2 to 3 minutes. The TNT, which alternatively may be flaked material, then is added and incorporated by mixing for about 1 to 2 minutes, followed by the zirconium acetate crosslinking agent dissolved in water. The zirconium salt is mixed in for appoximately 1 minute. By this time, the guar gum is well dispersed and hydrated. Finally, the magnesium oxide is added and incorporated by mixing for about 1 minute, after which time further thickening of the mixture is apparent. The composition at a temperature of about 90 to 100° F. is discharged to a cartridging machine, from which it is extruded into polyethylene tubes. These are closed after filling. The finished composition is a non-tacky gel having a density of about 1.4 g./cc. and a pH in the range of 7 to 9. The viscosity and strength of the gel composition increase appreciably during the first hour after packaging, which is evidence that crosslinking is continuing. The mixture is and remains uniform in appearance and composition, without segregation of undissolved components.

The blasting agent composition of this example has a calculated oxygen balance of —2%. It is not cap-sensitive, but in columns 3½ inches in diameter, can be primed with 100 grams of RDX and will detonate at a velocity in the order of 4500 meters per second.

*Example 4*

Using the general method of Example 3, a blasting agent is prepared from the following components:

| Composition: | Percent by weight |
|---|---|
| 60 wt. percent ammonium nitrate liquor | 40. |
| Fine sodium nitrate | 15. |
| Pelleted TNT | 25. |
| Finely ground ferrophosphorus | 19. |
| Finely ground guar gum flour | 0.5 |
| Magnesium oxide | 0.5 |
| Chromium nitrate, $Cr(NO_3)_3 \cdot 9H_2O$ | (1) |

[1] Sufficient to provide 2.0 millimoles of chromium per gram of guar gum.

The ferrophosphorus is incorporated into the mixture at the same time as the TNT, and the chromium nitrate crosslinking agent is predissolved in water.

The calculated oxygen balance of the composition of this example is —20%, and the density is approximately 1.7 g./cc. A charge of this type is not cap-sensitive, but can be primed in 5-inch diameter columns with about 100 grams of RDX. The detonation velocity is in the order of 4800 meters per second.

*Example 5*

The following Table II illustrates several types of water-bearing blasting agent formulations in which a variety of transition metal compounds and various sources of hydroxide ion are used to effect in situ crosslinking to produce stable, gelled compositions. The general preparative procedure for these compositions is that of Examples 3 and 4. The metallic and carbonaceous fuels are introduced in finely ground forms. Other minor variations in procedure are indicated in the table footnotes.

TABLE II

| Formula No. | Composition, percent by Weight | | | | | | | | | TransitionMetal Compound Crosslinking Agent (millimoles of transition metal/1 g. of gum) | Oxygen Balance |
|---|---|---|---|---|---|---|---|---|---|---|---|
| | $NH_4NO_3$ | $H_2O$ | $NaNO_3$ | TNT | FeP | Al | Coal | Guar Gum | Base | | |
| 5-A | 34.25 | 10.00 | 25.00 | 30.00 | 0 | 0 | 0 | 0.25 | 0.50, MgO | 0.8, $Cr(NO_3)_3 \cdot 9H_2O$ | —4 |
| 5-B | 28.0 | 28.0 | 10.5 | 30.0 | 0 | 0 | 0 | 3.0 | 0.5, MgO | 0.1, $Cr(NO_3)_3 \cdot 9H_2O$ | —15 |
| 5-C | 29.40 | 19.60 | 24.75 | 25.00 | 0 | 0 | 0 | 0.75 | 0.5, NaOH | 1.3, $Zr(OAc)_4$ | —2 |
| 5-D | 29.40 | 19.60 | 24.75 | 25.00 | 0 | 0 | 0 | 0.75 | 0.5, $NH_4OH$ | 0.4, $Zr(OAc)_4$ | —2 |
| 5-E | 29.40 | 19.60 | 24.75 | 25.00 | 0 | 0 | 0 | 0.75 | 0.5, $Na_3PO_4$ | 0.4, $Cr(NO_3)_3 \cdot 9H_2O$ | —2 |
| 5-F | 29.40 | 19.60 | 24.75 | 25.00 | 0 | 0 | 0 | 0.75 | 0.5, $Na_2CO_3$ | 0.4, $VOSO_4 \cdot 2H_2O$ | —2 |
| 5-G | 29.40 | 19.60 | 24.75 | 25.00 | 0 | 0 | 0 | 0.75 | 0.5, $(CH_3)_2NH$ | 0.4, $Y(NO_3)_3$ | —2 |
| 5-H | 29.40 | 19.60 | 25.20 | 25.00 | 0 | 0 | 0 | 0.75 | 0.05, NaOH | 0.4, $FeCl_3$ [1] | —2 |
| 5-I | 29.40 | 19.60 | 24.75 | 25.00 | 0 | 0 | 0 | 0.75 | 0.5, MgO | 0.7, $Mn(OAc)_2 \cdot 4H_2O$ [1] | —2 |
| 5-J | 29.40 | 19.60 | 24.25 | 25.00 | 0 | 0 | 0 | 0.75 | 1.0, NaOH | 0.4, $NbCl_5$ [1] | —2 |
| 5-K | 29.40 | 19.60 | 24.75 | 25.00 | 0 | 0 | 0 | 0.75 | 0.5, NaOH | 0.13, $HfO(NO_3)_2$ | —2 |
| 5-L | 29.40 | 19.60 | 25.00 | 25.00 | 0 | 90 | 0 | 0.75 | 0.25, NaOH | 0.3, $ScCl_3$ [1] | —2 |
| 5-M | 29.40 | 19.60 | 25.15 | 25.00 | 0 | 0 | 0 | 0.75 | 0.1, NaOH | 0.1, $TaCl_5$ [2] | —2 |
| 5-N | 29.40 | 19.60 | 24.75 | 25.00 | 0 | 0 | 0 | 0.75 | 0.5, NaOH | 0.13, $Ti(SO_4)_2$ [2] | —2 |
| 5-O | 29.40 | 19.60 | 25.00 | 25.00 | 0 | 0 | 0 | 0.75 | 0.25, NaOH | 0.7, $La(NO_3)_3$ | —2 |
| 5-P | 29.40 | 19.60 | 25.00 | 25.00 | 0 | 0 | 0 | 0.75 | 0.25, NaOH | 0.2, $K_2TiO(C_2O_4)_2$ | —2 |
| 5-Q | 29.40 | 19.60 | 25.19 | 25.00 | 0 | 0 | 0 | 0.75 | 0.06, MgO | 0.1, "Tyzor" LA [3] | —2 |
| 5-R | 29.40 | 19.60 | 25.44 | 25.00 | 0 | 0 | 0 | 0.5 | 0.06, MgO | 0.17, "Tyzor" La [3] | —2 |
| 5-S | 29.40 | 19.60 | 25.15 | 25.00 | 0 | 0 | 0 | 0.75 | 0.10, MgO | 0.22, "Tyzor" LA [3] | —2 |
| 5-T | 29.40 | 19.60 | 24.85 | 25.00 | 0 | 0 | 0 | 0.75 | 0.4, NaOH | 0.8, "Tyzor" AA [4] | —2 |
| 5-U | 29.40 | 19.60 | 25.00 | 25.00 | 0 | 0 | 0 | 0.75 | 0.25, NaOH | 0.4, "Tyzor" TE [5] | —2 |
| 5-V | 29.40 | 19.60 | 24.25 | 25.00 | 0 | 0 | 0 | [6] 1.5 | 0.25, NaOH | 0.2, $VOSO_4 \cdot 2H_2O$ | —3 |
| 5-W | 27.00 | 15.00 | 17.28 | 20.00 | 5.00 | 15.00 | 0 | 0.6 | 0.12, NaOH | 0.6, $Cr(NO_3)_3 \cdot 9H_2O$ | —18 |
| 5-X | 27.00 | 15.00 | 22.28 | 20.00 | 0 | 15.00 | 0 | 0.6 | 0.12, NaOH | 0.6, $Cr(NO_3)_3 \cdot 9H_2O$ | —13 |
| 5-Y | 51.3 | 21.7 | 15.8 | 0 | 0 | 4.0 | 5.5 | 1.5 | 0.2, NaOH | 0.6, $Cr(NO_3)_3 \cdot 9H_2O$ | —2 |
| 5-Z | 48.2 | 20.6 | 15.0 | 10.0 | 0 | 2.0 | 3.0 | 1.0 | 0.2, NaOH | 0.6, $Cr(NO_3)_3 \cdot 9H_2O$ | —1 |
| 5-AA | 55.1 | 18.9 | 0 | [7] 10.0 | 0 | 0 | 0 | 1.0 | 0.2, NaOH | 0.6, $Cr(NO_3)_3 \cdot 9H_2O$ | —1 |
| 5-BB | 29.40 | 19.60 | 24.75 | 25.0 | 0 | 0 | 0 | 0.75 | 0.5, MgO | 0.7, $Cr(NO_3)_3 \cdot 9H_2O$ | —2 |

[1] Dissolved in parent acid.
[2] Dissolved in water containing a small amount of HF.
[3] Titanium-ammonium lactate chelate (E. I. du Pont de Nemours & Co.):

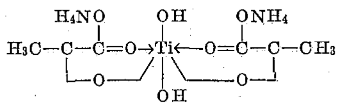

[4] Titanium-acetylacetonate chelate (E. I. du Pont de Nemours & Co.):

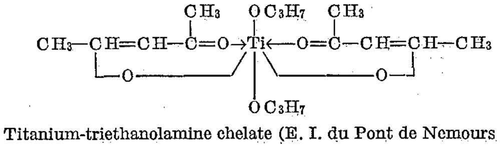

[5] Titanium-triethanolamine chelate (E. I. du Pont de Nemours & Co.):

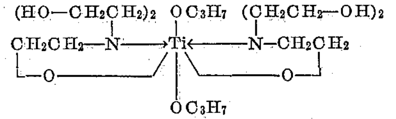

[6] Locust bean gum used in place of guar gum.
[7] Plus 14.8% RDX. Incorporation of both the TNT and RDX in the hot ammonium nitrate liquor is accomplished in the temperature range of about 185–190° C.

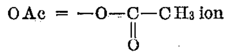

All the compositions of Table II have a thickened consistency such that the ingredients remain uniformly distributed, and segregation of components does not take plate after the compositions are discharged from the mixer. On the other hand, additional thickening and gelation is evident in some of the compositions after the mixing step, especially in cases where the types and concentrations of transition metal compound and base are such as to give relatively slow reaction therein.

An evaluation of the foregoing types of blasting agent compositions is made at 100° F., an elevated temperature that can exist both during transport of the explosives and in field storage. The test samples, representative of the compositions of Table II, are kept at this temperature in tightly closed containers and are examined periodically for degradation, as evidenced by visible segregation of liquid (syneresis) or of insoluble materials, e.g., the metallic fuels, forming, and development of stickiness. All the test samples remain intact without these signs of degradation for a period of several weeks. Compositions of the type shown in Example 3 and Formula 5–C of Example 5 containing a zirconium compound as crosslinking agent are exceptionally stable in not showing any of the aforementioned signs of deterioration after a period of 18–20 weeks at 100° F. The same is true with formulas of the 5–H and 5–BB types in Table II containing an iron compound and a chromium compound crosslinking agent, respectively, wherein degradation is not apparent after 20 weeks at 100° F. Formulas of the 5–Q to 5–S types containing the titanium chelate, "Tyzor" LA, as crosslinking components are similarly stable for 16–18 weeks at 100° F. For comparative purposes, two samples are prepared that are substantially the same in composition as Formulas 5–C to 5–U and 5–BB of Table II, except that they do not contain added base or transition metal compound, but rather are crosslinked with borax ($Na_2B_4O_7 \cdot 10H_2O$). In one of these comparative formulas, containing 1% by weight of guar gum, the borax provides 0.1 millimole of boron per gram of guar gum and in the other formula, containing 0.75% guar gum, the borax supplies 0.2 millimole of boron per gram of guar gum. Both the comparative samples show visible signs of deterioration, as judged by the foregoing criteria, after one to two weeks in the 100° F. storage stability test.

Interest in gelled, water-containing explosive compositions for blasting operations has increased in recent years. Hence it is easy to appreciate the practical significance of the illustrated improvements in stability of the compositions of this invention over the gelled compositions known heretofore. For example, the containers are sometimes stripped from such charges just before they are loaded into the borehole. Such a "shucking" operation is practicable only if the compositions have retained their initial nontacky characteristics. In the absence of a container, the crosslinked compositions also need to retain a high degree of resistance to disintegration and leaching by water, which may be present in the borehole or may enter the hole if there is a time lapse between loading and initiation of the charge. Leaching, if it occurs, may lead to total failure of detonation or failure of propagation of detonation in a section that has been exposed to water. Furthermore, whether the composition is in the cartridge or has been "shucked" therefrom is relatively immaterial if appreciable deterioration of the gel structure has occurred. Under such conditions, gross segregation of solid (undissolved) oxidizer and fuel components may occur to an extent such that the charge either cannot be detonated or a detonation will not propagate through the entire length of the charge column. The blasting agent compositions produced by the instant inventive process are remarkably free of such deficiencies and failures.

I claim:

1. A process for the gelation of galactomannan gums which comprises mixing water, galactomannan gum, base capable of producing hydroxide ions, and crosslinking agent selected from at least one of the group consisting of the compounds of the transition metals of atomic number 21 to 26 inclusive, 39 to 41 inclusive, 57, 72, and 73, said crosslinking agent being soluble in the system and providing from about 0.005 to 5 millimoles of transition metal per gram of galactomannan, said gelation being conducted at a pH of from about 6 to 13.

2. A process of claim 1 wherein said crosslinking agent is selected from the group consisting of transition metal salts of acids having first dissociation constant with a $pK_a$ of no greater than about 6 and transition metal amino-alcohol and β-diketo chelates.

3. A process of claim 2, wherein said base is added to a preformed mixture comprising water, galactomannan gum, and crosslinking agent to adjust the pH of said mixture to from about 6 to 13.

4. A process of claim 3, wherein said preformed mixture addition contains mineral acid.

5. A process of claim 2, wherein said galactomannan gum is locust bean gum in a concentration of from about 0.25 to 5% by weight of the total gelation mixture.

6. A process of claim 2, wherein said galactomannan gum is guar gum in a concentration of from about 0.25 to 5% by weight of the total gelation mixture.

7. A process of claim 2, wherein said crosslinking agent is selected from the group consisting of strong mineral acid and lower alkanoic acid-salts of said transition metals.

8. A process of claim 2, wherein said crosslinking agent is a chelate of one of said transition metals.

9. In the process for gelling water-bearing explosive compositions containing galactomannan gum with crosslinking-agent in situ, the improvement which comprises effecting said gelation by the process of claim 2.

10. A process of claim 9, wherein said base is added to the water-bearing explosive containing said galactomannan and crosslinking agent, said crosslinking agent provides about from 0.01 to 3 millimoles of transition metal per gram of galactomannan, and said gelation is carried out at a pH of less than about 9.

11. A process of claim 10, wherein said crosslinking agent is a titanium-lactic acid chelate and said galactomannan is guar gum.

12. A process of claim 10, wherein said crosslinking agent is chromium nitrate and said galactomannan is guar gum.

13. A process of claim 10, wherein said crosslinking agent is iron nitrate and said galactomannan is guar gum.

14. A process of claim 10, wherein said crosslinking agent is zirconium acetate and said galactomannan is guar gum.

15. A stable aqueous gel comprising a uniform mixture of water and galactomannan gum crosslinked in situ at a pH of from about 6 to 13 with base capable of producing hydroxide ions and crosslinking agent selected from at least one of the group consisting of compounds of the transition metals of atomic number 21 to 26 inclusive, 39 to 41 inclusive, 57, 72, and 73, said crosslinking agent being soluble in the system and providing from about 0.005 to 5 millimoles of transition metal per gram of galactomannan.

16. A stable aqueous gel of claim 15 wherein said crosslinking agent is selected from the group consisting of transition metal salts of acids having a first dissociation constant with a $pK_a$ of no greater than about 6 and transition metal amino-alcohol and β-diketo chelates.

17. A stable aqueous gel of claim 16, said gel being a water-bearing explosive comprising inorganic oxidizing salt, fuel, about from 5 to 45% by weight of water and about from 0.25 to 5% by weight of said galactomannan crosslinked in situ with said crosslinking agent.

18. A stable, gelled, water-bearing explosive composition of claim 17 having an oxygen balance of about from −30 to +10 comprising:

(a) about from 20 to 70% of ammonium nitrate;
(b) 0 to about 40% by weight of sodium nitrate;
(c) 0 to about 40% by weight of self-explosive comprising TNT;
(d) 0 to about 30% of at least one metallic fuel selected from aluminum and ferrophosphorus;
(e) 0 to about 10% by weight of particulate carbon;
(f) about from 10 to 30% by weight of water; and
(g) about from 0.2 to 2% by weight of galactomannan gum, said composition including as fuel one of the group consisting of component (c) above and combinations of at least two of components (c), (d) and (e), said galactomannan being crosslinked in situ in the presence of added base at a pH of from about 6 to 9 with from about 0.01 to 3 millimoles transition metal per gram of galactomannan.

19. A composition of claim 18, wherein said added base is magnesium oxide and said galactomannan is guar gum.

20. A composition of claim 18, wherein the concentration of transition metal is from 0.1 to 1 millimole per gram of galactomannan.

References Cited by the Examiner

UNITED STATES PATENTS

| | | | |
|---|---|---|---|
| 2,720,468 | 10/1955 | Shacklett | 117—34 |
| 3,097,120 | 7/1963 | Hoffman et al. | 149—19 |
| 3,108,917 | 10/1963 | McIrvine | 149—20 |
| 3,202,556 | 8/1965 | Chrisp | 149—60 X |
| 3,251,781 | 5/1966 | Jordan | 149—60 X |

References Cited by the Applicant

Whistler, R. L.: Industrial Gums—Polysaccharides and Their Derivatives, chapter XIV, "Guar Gum," Academic Press, New York, pages 336–341 (1959).

CARL D. QUARFORTH, *Primary Examiner.*

BENJAMIN R. PADGETT, *Examiner.*

L. A. SEBASTIAN, *Assistant Examiner.*